United States Patent
Ishii et al.

(10) Patent No.: US 10,541,749 B2
(45) Date of Patent: Jan. 21, 2020

(54) OPTICAL WAVELENGTH MULTIPLEXING TRANSMISSION APPARATUS AND OPTICAL WAVELENGTH MULTIPLEXING TRANSMISSION METHOD

(71) Applicant: FUJITSU LIMITED, Kawasaki-shi, Kanagawa (JP)

(72) Inventors: Shigeru Ishii, Ota (JP); Hiroki Oi, Kawasaki (JP); Takehiro Fujita, Setagaya (JP); Tatsuya Tsuzuki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/358,632

(22) Filed: Mar. 19, 2019

(65) Prior Publication Data

US 2019/0312641 A1    Oct. 10, 2019

(30) Foreign Application Priority Data

Apr. 9, 2018  (JP) .................................. 2018-075091

(51) Int. Cl.
*H04B 10/00* (2013.01)
*H04B 10/079* (2013.01)
(Continued)

(52) U.S. Cl.
CPC ..... *H04B 10/07957* (2013.01); *H04B 10/296* (2013.01); *H04J 14/0221* (2013.01); *H04B 2210/258* (2013.01)

(58) Field of Classification Search
CPC .............. H04B 10/293; H04B 10/2931; H04B 10/2933; H04B 10/2935; H04B 10/2937;
(Continued)

(56) References Cited

U.S. PATENT DOCUMENTS 6,510,000 B1 * 1/2003 Onaka ..................... H01S 3/302
                                                  359/334
6,785,042 B1 * 8/2004 Onaka ................. H01S 3/06758
                                                  359/334
(Continued)

FOREIGN PATENT DOCUMENTS

JP    2001-053686    2/2001
JP    2002-368691   12/2002
(Continued)

*Primary Examiner* — Daniel G Dobson
(74) *Attorney, Agent, or Firm* — Fujitsu Patent Center

(57) ABSTRACT

A transmission apparatus includes a demultiplexer configured to demultiplex a multiplexed signal including wavelength multiplexed signals having individual wavelength bands into a wavelength multiplexed signal for each of the wavelength bands, a detector configured to detect a power value of each of the wavelength multiplexed signals for each of the wavelength bands, first compensators configured to compensate for a tilt in the wavelength multiplexed signal based on the power value for each of the wavelength bands, second compensators configured to compensate for a power of the wavelength multiplexed signal for each of the wavelength bands so as to reduce a power difference among wavelength multiplexed signals after the tilt compensation based on the power value for each of the wavelength bands, and a multiplexer configured to multiplex each of the wavelength multiplexed signals after the power compensation and output a multiplexed signal.

10 Claims, 14 Drawing Sheets

(51) Int. Cl.
*H04J 14/02* (2006.01)
*H04B 10/296* (2013.01)
*H04J 14/00* (2006.01)

(58) Field of Classification Search
CPC ............. H04B 10/2939; H04B 10/294; H04B 10/2941; H04B 10/2942; H04B 10/296
See application file for complete search history.

(56) References Cited

U.S. PATENT DOCUMENTS

| | | |
|---|---|---|
| 6,885,499 B1 | 4/2005 | Hoshida et al. |
| 2002/0181061 A1 | 12/2002 | Uda et al. |
| 2006/0203329 A1 | 9/2006 | Nishihara et al. |
| 2010/0091357 A1 | 4/2010 | Ueki et al. |

FOREIGN PATENT DOCUMENTS

| | | |
|---|---|---|
| JP | 2006-295113 | 10/2006 |
| JP | 2010-097987 | 4/2010 |

\* cited by examiner

OPTICAL WAVELENGTH MULTIPLEXING TRANSMISSION APPARATUS AND OPTICAL WAVELENGTH MULTIPLEXING TRANSMISSION METHOD

CROSS-REFERENCE TO RELATED APPLICATION

This application is based upon and claims the benefit of priority of the prior Japanese Patent Application No. 2018-75091, filed on Apr. 9, 2018, the entire contents of which are incorporated herein by reference.

FIELD

The embodiments discussed herein are related to an optical wavelength multiplexing transmission apparatus and an optical wavelength multiplexing transmission method.

BACKGROUND

In recent years, for example, in order to perform high-speed and large-capacity communication, an optical wavelength division multiplexing (WDM) transmission method is known for transmitting an optical signal having a plurality of wavelengths in a multiplexed manner. In order to expand the transmission capacity, for example, a multiband system is known that uses a plurality of optical wavelength bands, such as a conventional band (C-band), a long band (L-band), and the like. C-band refers to, for example, an optical wavelength band of 1530 nm to 1565 nm. L-band refers to, for example, an optical wavelength band of 1565 nm to 1625 nm. In a WDM transmission method, a large power deviation (tilt) occurs at the short wavelength side and the long wavelength side of an optical fiber during transmission, for example, by having been affected by a wavelength dependent loss (WDL), stimulated Raman scattering (SRS), and the like. As a result, the quality of a signal on the reception side deteriorates. Accordingly, in order to reduce deterioration of the signal quality on the reception side, tilt compensation is requested.

However, in a multiband system, the optical wavelength band to be used is expanded, and thus the tilts that occur on the shortest wavelength side and the longest wavelength side of an optical signal transmitted becomes large compared with the case of a single-band system that uses only a single optical wavelength band. For example, a tilt due to a WDL depends on the characteristic of an optical fiber of the transmission path, and does not depend on the number of wavelengths that is changed during operation, and thus it is relatively easy to estimate a tilt quantity and to compensate for the tilt. In contrast, a tilt due to SRS depends on the number of wavelengths that is changed during operation, and thus tilt compensation has to be performed in accordance with the number of wavelengths.

Thus, in a tilt compensation technique for a multiband system, a method is known for monitoring the spectrum of a signal wavelength by a reception-side WDM apparatus, feeding back the monitor result to a transmission-side WDM apparatus, and compensating for a tilt by the transmission-side WDM apparatus based on the monitor result. In this method, it is possible to realize high-precision tilt compensation not only for a tilt that occurs on a transmission path between the reception-side WDM apparatus and the transmission-side WDM apparatus, but also in accordance with the number of wavelengths that is changed during operation. As the related art, for example, Japanese Laid-open Patent Publication Nos. 2002-368691, 2010-97987, 2006-295113, and 2001-53686, and the like are disclosed.

However, the transmission-side WDM apparatus obtains a monitor result from the reception-side WDM apparatus, and thus it takes a long time before tilt compensation is performed. For example, it is assumed that when the number of wavelengths is changed abruptly due to a disconnection of an optical fiber, a device failure, or the like, tilt compensation is not made in time, and thus a signal error sometimes occurs due to deterioration of the reception-side signal quality.

For a method of realizing high-speed tilt compensation, a method is provided for monitoring the input power of a WDM signal input to the transmission amplifier in a WDM apparatus and compensating for a tilt in the WDM signal based on the input power. However, in this method, although it is possible to make tilt compensation in a WDM signal of the same optical wavelength band, it is not possible to make compensation for SRS tilt that occurs among the WDM signals having different optical wavelength bands in a multiband system. Accordingly, in reality, a WDM apparatus is demanded that is capable of compensating for SRS tilt at high speed and with high precision in a multiband system.

In view of the above, it is desirable to provide an optical wavelength multiplexing transmission apparatus, or the like capable of compensating for an SRS tilt at high speed and with high precision in a multiband system.

SUMMARY

According to an aspect of the embodiments, an optical wavelength multiplexing transmission apparatus includes a demultiplexer configured to demultiplex a multiplexed signal including a plurality of optical wavelength multiplexed signals having individual optical wavelength bands into an optical wavelength multiplexed signal for each of the optical wavelength bands, a detector configured to detect a power value of each of the optical wavelength multiplexed signals for each of the optical wavelength bands, first compensators configured to compensate for a tilt in the optical wavelength multiplexed signal based on the power value for each of the optical wavelength bands, second compensators configured to compensate for a power of the optical wavelength multiplexed signal for each of the optical wavelength bands so as to reduce a power difference among optical wavelength multiplexed signals after the tilt compensation based on the power value for each of the optical wavelength bands, and a multiplexer configured to multiplex each of the optical wavelength multiplexed signals after the power compensation and output a multiplexed signal.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

In the following, a detailed description will be given of an optical wavelength multiplexing transmission apparatus and an optical wavelength multiplexing transmission method according to embodiments of the present disclosure with reference to the drawings. The disclosed technique will not be limited by each of the embodiments. Each of the embodiments described below may be suitably combined within a range that does not cause a conflict.

First Embodiment

Figure 1:
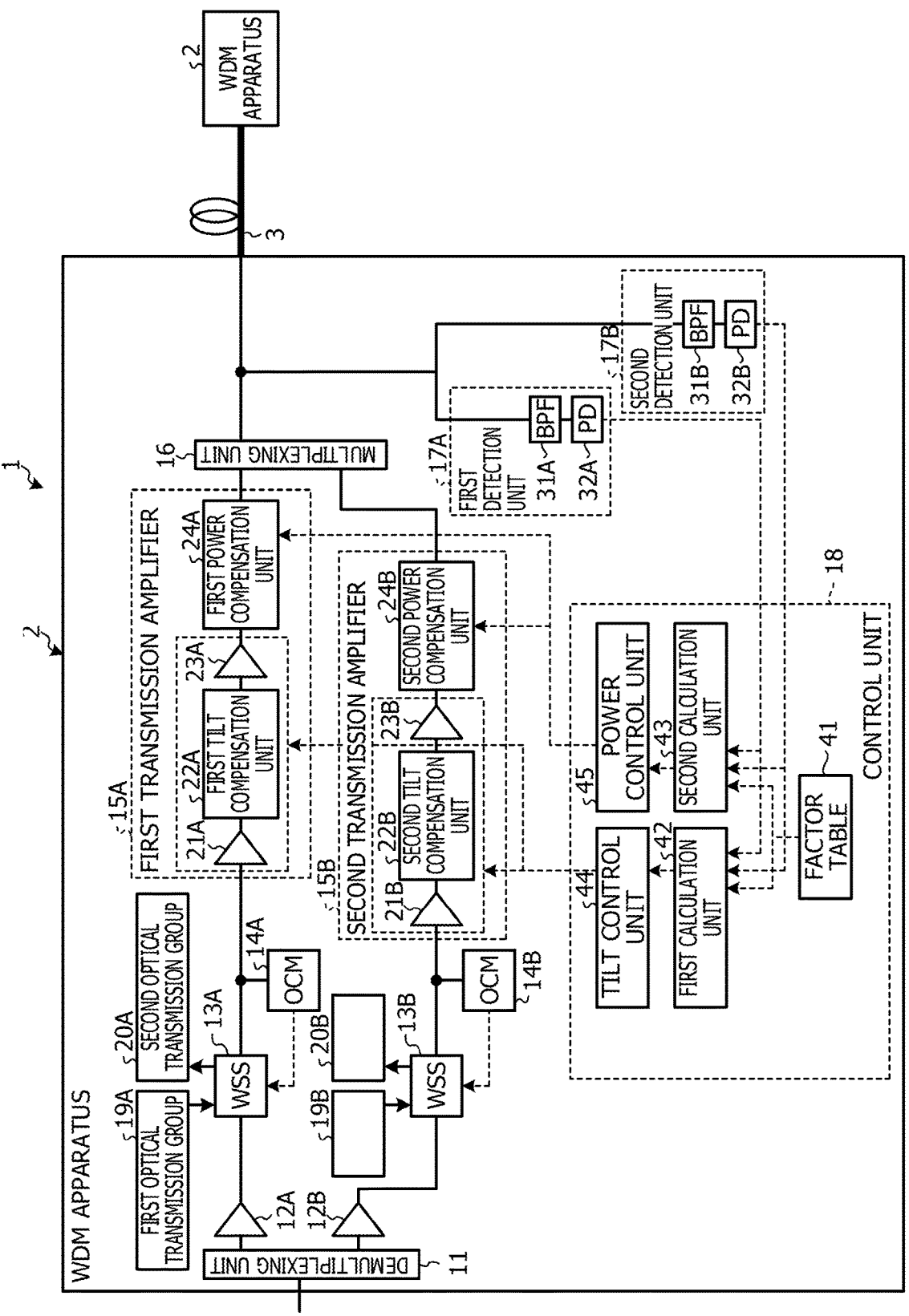
FIG. 1 is an explanatory diagram illustrating an example of a WDM system according to a first embodiment.

FIG. 1 illustrates a WDM system 1 according to a first embodiment. The WDM system 1 includes a plurality of WDM apparatuses 2 and couples the WDM apparatuses 2 via an optical fiber 3. The WDM system 1 is a multiband system for division multiplexing an optical signal having a plurality of optical wavelength bands. The WDM system 1 is a system that multiplexes a WDM signal of a first optical wavelength band, for example, the C-band and a second WDM signal of a second optical wavelength band, for example, the L-band. Each of the WDM apparatuses 2 outputs a WDM signal produced by multiplexing a first WDM signal of the C-band and the second WDM signal of the L-band onto the optical fiber 3 and enables a WDM signal received via the optical fiber 3 to be separated into the first WDM signal of the C-band and the second WDM signal of the L-band.

The WDM apparatus 2 illustrated in FIG. 1 includes a demultiplexing unit 11, a first reception amplifier 12A, a second reception amplifier 12B, a first wavelength selective switch (WSS) 13A, and a second WSS 13B. The WDM apparatus 2 includes a first optical channel monitor (OCM) 14A, a second OCM 14B, a first transmission amplifier 15A, a second transmission amplifier 15B, a multiplexing unit 16, a first detection unit 17A, a second detection unit 17B, and a control unit 18. The WDM apparatus 2 includes a first optical transmission group 19A, a second optical transmission group 19B, a first optical reception group 20A, and a second optical reception group 20B.

The demultiplexing unit 11 demultiplexes the WDM signal into the first WDM signal of the C-band and the second WDM signal of the L-band, outputs the first WDM signal to the first reception amplifier 12A, and outputs the second WDM signal to the second reception amplifier 12B.

The first reception amplifier 12A is an optical amplifier that optically amplifies the first WDM signal and outputs the optically amplified first WDM signal to the first WSS 13A. The first WSS 13A is a wavelength selective switch that optically branches the first WDM signal into an optical signal having an optical wavelength corresponding to the first optical reception group 20A and optically inserts an optical signal from the first optical transmission group 19A into the first WDM signal. The first WSS 13A outputs the optically branched or inserted first WDM signal to the first transmission amplifier 15A. The first transmission amplifier 15A is an optical amplifier that performs tilt compensation on the first WDM signal and performs power compensation on the first WDM signal after the tilt compensation. The first transmission amplifier 15A outputs the first WDM signal after the tilt compensation and after the power compensation to the multiplexing unit 16.

The second reception amplifier 12B is an optical amplifier that optically amplifies the second WDM signal and outputs the optically amplified second WDM signal to the second WSS 13B. The second WSS 13B is a wavelength selective switch that optically branches the second WDM signal into an optical signal having an optical wavelength corresponding to the second optical reception group 20B and optically inserts an optical signal from the second optical transmission group 19B into the second WDM signal. The second WSS 13B outputs the optically branched or inserted first WDM signal to the second transmission amplifier 15B. The second transmission amplifier 15B is an optical amplifier that performs tilt compensation on the second WDM signal and performs power compensation on the second WDM signal after the tilt compensation. The second transmission amplifier 15B outputs the second WDM signal after the tilt compensation and after the power compensation to the multiplexing unit 16.

The multiplexing unit 16 multiplexes the first WDM signal output from the first transmission amplifier 15A and the second WDM signal output from the second transmission amplifier 15B, and outputs a WDM signal onto the optical fiber 3 coupled by an optical connector not illustrated in FIG. 1. The first detection unit 17A is a detection unit that detects a first power value, which is an output power of the first WDM signal from the WDM signal output by the multiplexing unit 16 that performs transmission between the multiplexing unit 16 and the optical fiber 3, and notifies the control unit 18 of the first power value. The second detection unit 17B is a detection unit that detects a second power value, which is an output power of the second WDM signal from the WDM signal output by the multiplexing unit 16 that performs transmission between the multiplexing unit 16 and the optical fiber 3, and notifies the control unit 18 of the second power value.

The first transmission amplifier 15A includes a first preamplifier 21A, a first tilt compensation unit 22A, a first post-amplifier 23A, and a first power compensation unit 24A. The first preamplifier 21A and the first post-amplifier 23A are, for example, erbium-doped fiber amplifiers (EDFA), or the like.

The first preamplifier 21A optically amplifies the first WDM signal output from the first WSS 13A, and outputs an optically amplified first WDM signal to the first tilt compensation unit 22A. The first tilt compensation unit 22A is a first compensation unit, such as a variable attenuator, or the like that performs tilt compensation so as to reduce the tilt quantity in the first WDM signal. It is possible for the first tilt compensation unit 22A to change, for example, the gain deviation for each wavelength by about 1 dB by increasing the gain by ±1 dB. The first tilt compensation unit 22A outputs the first WDM signal after the tilt compensation to the first post-amplifier 23A. The first post-amplifier 23A amplifies the first WDM signal after the tilt compensation and outputs the amplified first WDM signal to the first power compensation unit 24A. The first power compensation unit 24A is a second compensation unit, such as a variable attenuator, or the like that performs power compensation on the first WDM signal after the tilt compensation. The first power compensation unit 24A performs power compensation on the entire first WDM signal so as to reduce the power difference between the first WDM signal and the second WDM signal. The first power compensation unit 24A outputs the first WDM signal after the power compensation to the multiplexing unit 16.

The second transmission amplifier 15B includes a second preamplifier 21B, a second tilt compensation unit 22B, a second post-amplifier 23B, and a second power compensation unit 24B. The second preamplifier 21B and the second post-amplifier 23B are, for example, erbium-doped fiber amplifiers (EDFA), or the like.

The second preamplifier 21B optically amplifies the second WDM signal output from the second WSS 13B and outputs an optically amplified second WDM signal to the second tilt compensation unit 22B. The second tilt compensation unit 22B is a first compensation unit, such as a variable attenuator, or the like that performs tilt compensation so as to reduce the tilt quantity in the second WDM signal. It is possible for the second tilt compensation unit 22B to change, for example, the gain deviation for each wavelength by about 1 dB by increasing the gain by ±1 dB. The second tilt compensation unit 22B outputs the second WDM signal after the tilt compensation to the second post-amplifier 23B. The second post-amplifier 23B amplifies the second WDM signal after the tilt compensation and outputs the amplified second WDM signal to the second power compensation unit 24B. The second power compensation unit 24B is a second compensation unit, such as a variable attenuator, or the like that performs power compensation on the second WDM signal after the tilt compensation. The second power compensation unit 24B performs power compensation on the entire second WDM signal so as to reduce the power difference between the first WDM signal and the second WDM signal. The second power compensation unit 24B outputs the second WDM signal after the power compensation to the multiplexing unit 16.

The first detection unit 17A includes a band pass filter (BPF) 31A and a photo diode (PD) 32A. The BPF 31A extracts the first WDM signal from the WDM signal output from the multiplexing unit 16 and outputs the extracted first WDM signal to the PD 32A. The PD 32A photoelectrically converts the output power of the first WDM signal output from the BPF 31A to the optical fiber 3 into an electric power, detects a first power value, and outputs the first power value to a first calculation unit 42 and a second calculation unit 43 that are described later.

The second detection unit 17B includes a BPF 31B and a PD 32B. The BPF 31B extracts the second WDM signal from the WDM signal output from the multiplexing unit 16 and outputs the extracted second WDM signal to the PD 32B. The PD 32B photoelectrically converts the output power of the second WDM signal output from the BPF 31B to the optical fiber 3 into an electric power, detects a second power value, and outputs the second power value to the first calculation unit 42 and the second calculation unit 43 described later.

The first OCM 14A is a monitoring unit that monitors optical power for each wavelength of the first WDM signal output from the first WSS 13A and notifies the first WSS 13A of the monitoring result. The first WSS 13A controls the optical power for each wavelength such that the power deviation of each wavelength of the first WDM signal falls within a predetermined range based on the monitoring result from the first OCM 14A. A predetermined range refers to a range of power deviation, for example, to the extent of range that does not affect the tilt compensation. As a result, the first WSS 13A inputs the first WDM signal after the power control into the first transmission amplifier 15A, and thus the precision of the tilt compensation for the first WDM signal performed by the first transmission amplifier 15A is increased.

The second OCM 14B is a monitoring unit that monitors optical power for each wavelength of the second WDM signal output from the second WSS 13B and notifies the second WSS 13B of the monitoring result. The second WSS 13B controls the optical power for each wavelength such that the power deviation of each wavelength of the second WDM signal falls within a predetermined range based on the monitoring result from the second OCM 14B. As a result, the second WSS 13B inputs the second WDM signal after the power control into the second transmission amplifier 15B, and thus the precision of the tilt compensation for the second WDM signal performed by the second transmission amplifier 15B is increased.

The control unit 18 includes a factor table 41, a first calculation unit 42, a second calculation unit 43, a tilt control unit 44, and a power control unit 45. The first calculation unit 42 calculates a first tilt compensation quantity to be set in first tilt compensation unit 22A and calculates a second tilt compensation quantity to be set in the second tilt compensation unit 22B. The tilt control unit 44 controls the first tilt compensation unit 22A based on the first tilt compensation quantity and controls the second tilt compensation unit 22B based on the second tilt compensation quantity.

The second calculation unit 43 calculates a first power compensation quantity to be set in the first power compensation unit 24A and calculates a second power compensation quantity to be set in the second power compensation unit 24B. The power control unit 45 controls the first power compensation unit 24A based on the first power compensation quantity and controls the second power compensation unit 24B based on the second power compensation quantity.

Figure 2:
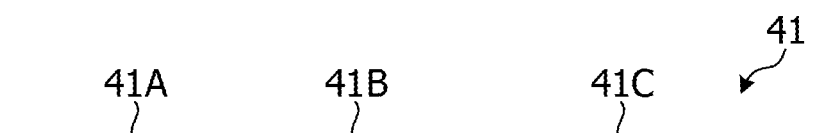
FIG. 2 is an explanatory diagram illustrating an example of the table structure of a factor table.

FIG. 2 is an explanatory diagram illustrating an example of the table structure of a factor table. The factor table 41 illustrated in FIG. 2 manages a factor 41B and a loss factor 41C for each fiber type 41A of the optical fiber 3 in association with each other. The first calculation unit 42 obtains a factor 41B and a loss factor 41C corresponding to a fiber type 41A of an optical fiber from the factor table 41. The first calculation unit 42 calculates the first tilt compensation quantity and the second tilt compensation quantity based on the obtained factor 41B and loss factor 41C, the first power value, and the second power value. The first tilt compensation quantity is a compensation quantity for compensating the SRS tilt in the C-band first WDM signal, and the second tilt compensation quantity is a compensation quantity for compensating the SRS tilt in the L-band second WDM signal.

The second calculation unit 43 obtains a factor 41B and a loss factor 41C corresponding to a fiber type 41A of the optical fiber 3 from the factor table 41. The second calculation unit 43 calculates a first power compensation quantity and a second power compensation quantity based on the obtained factor 41B and loss factor 41C, the first power value, and the second power value. The first power compensation quantity is a compensation quantity for compensating for the entire optical power difference among the optical wavelength bands that occurs due to SRS, which was calculated using the second power value of the second WDM signal and the loss factor. The second power compensation quantity is a compensation quantity for compensating for the entire optical power difference among the optical wavelength bands that occurs due to SRS, which was calculated using the first power value of the first WDM signal and the loss factor.

The tilt control unit 44 controls the first tilt compensation unit 22A so as to reduce the tilt quantity in the first WDM signal based on the first tilt compensation quantity. The tilt control unit 44 controls the second tilt compensation unit 22B so as to reduce the tilt quantity in the second WDM signal based on the second tilt compensation quantity.

The power control unit 45 controls the first power compensation unit 24A so as to reduce the power difference between the first WDM signal and the second WDM signal based on the first power compensation quantity. The power control unit 45 controls the second power compensation unit 24B so as to reduce the power difference between the first WDM signal and the second WDM signal based on the second power compensation quantity. As a result, it is possible to perform control so that the power deviation for each wavelength of a plurality of optical wavelength bands falls within a predetermined range at the WDM apparatus 2 on the opposite side coupled via the optical fiber 3 at the time of multiband transmission.

The first calculation unit 42 refers to the factor table 41 and calculates a first tilt compensation quantity using (first power value×factor a)+(second power value×factor b). The first calculation unit 42 calculates a second tilt compensation quantity using (second power value×factor c)+(first power value×factor d). The second calculation unit 43 calculates a first power compensation quantity using (second power value×factor e). The second calculation unit 43 calculates a second power compensation quantity using (first power value×factor f).

Figure 3:
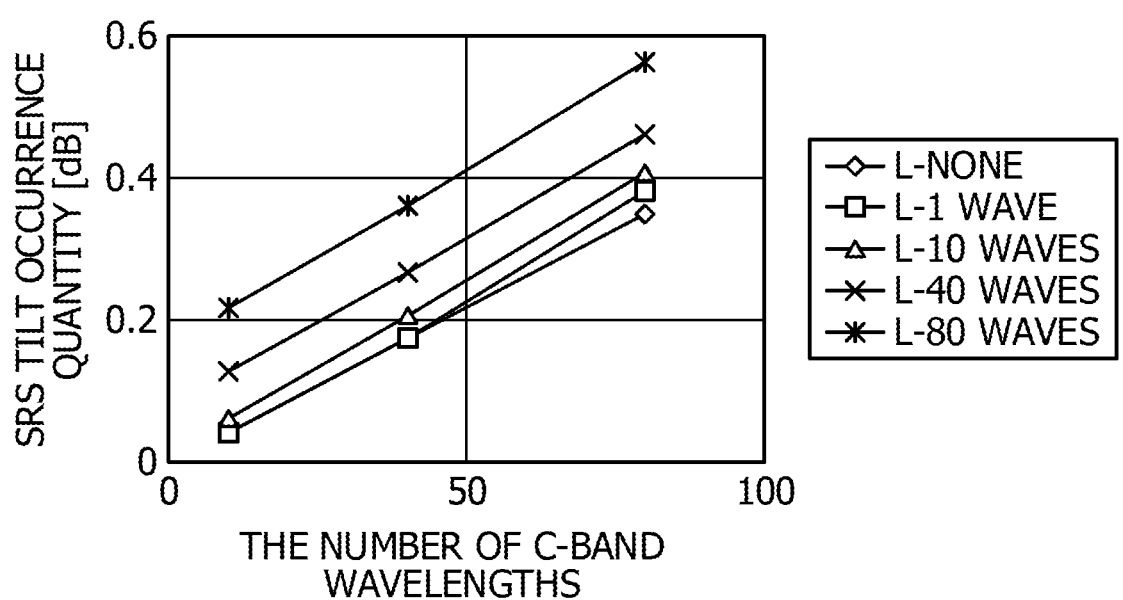
FIG. 3 is an explanatory diagram illustrating the relationship between the C-band SRS tilt occurrence quantity and the number of C-band wavelengths.

Next, a description will be given of a numerical expression for calculating the first tilt compensation quantity and the second tilt compensation quantity. FIG. 3 is an explanatory diagram illustrating the relationship between the C-band SRS tilt occurrence quantity and the number of C-band wavelengths. The C-band SRS tilt occurrence quantity increases in proportion to the number of C-band wavelengths as illustrated in FIG. 3. However, its slope does not depend on an increase in the number of L-band wavelengths as illustrated in FIG. 3, and the SRS tilt occurrence quantity increases at a fixed amount. It is possible to replace the number of wavelengths with power by multiplying the number of wavelengths by power per one wavelength, and thus the horizontal axis may be replaced with output power.

Figure 4:
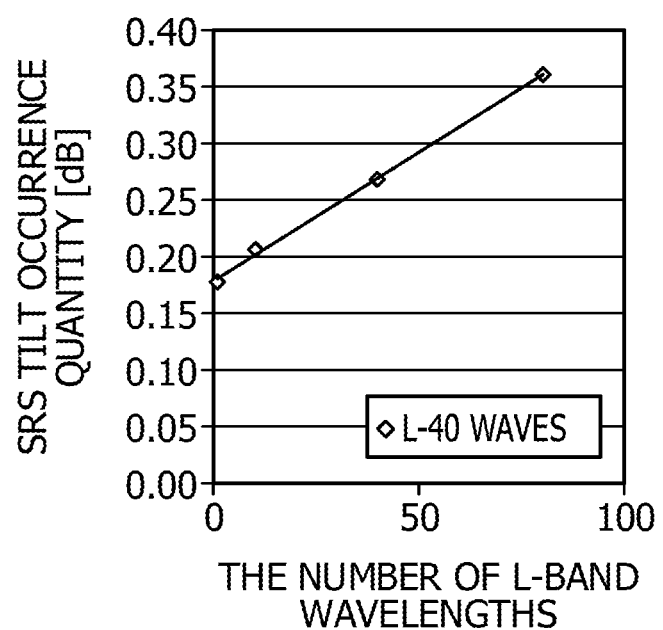
FIG. 4 is an explanatory diagram illustrating the relationship between the SRS tilt occurrence quantity and the number of L-band wavelengths when attention is focused on the C-band 40 waves.

FIG. 4 is an explanatory diagram illustrating the relationship between the SRS tilt occurrence quantity and the number of L-band wavelengths when attention is focused on the C-band 40 waves. As illustrated in FIG. 4, the C-band SRS tilt occurrence quantity increases in accordance with an increase in the number of L-band wavelengths, but its slope does not depend on the number of L-band wavelengths. That is to say, the SRS tilt occurrence quantity in the first WDM signal increases at a fixed amount in accordance with an increase in the number of wavelengths in the second WDM signal, but its slope does not depend on the number of wavelengths in the second WDM signal. Accordingly, in consideration of the relationships illustrated in FIG. 3 and FIG. 4, it is possible to calculate a first tilt compensation quantity in the first WDM signal using (first power value×factor a)+(second power value×factor b).

Figure 5:
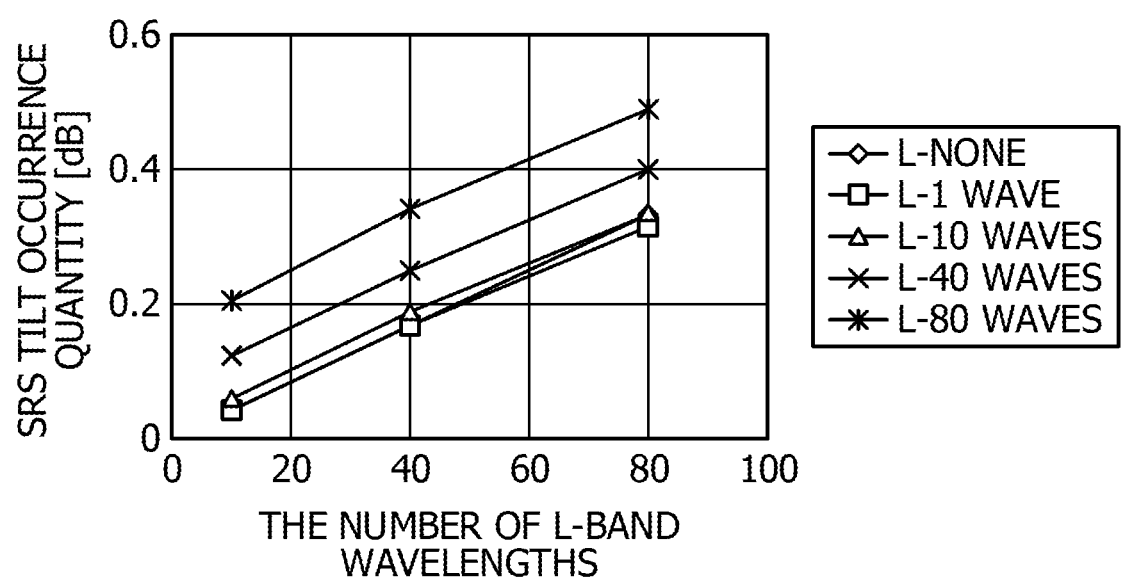
FIG. 5 is an explanatory diagram illustrating the relationship between the L-band SRS tilt occurrence quantity and the number of L-band wavelengths.
Figure 6:
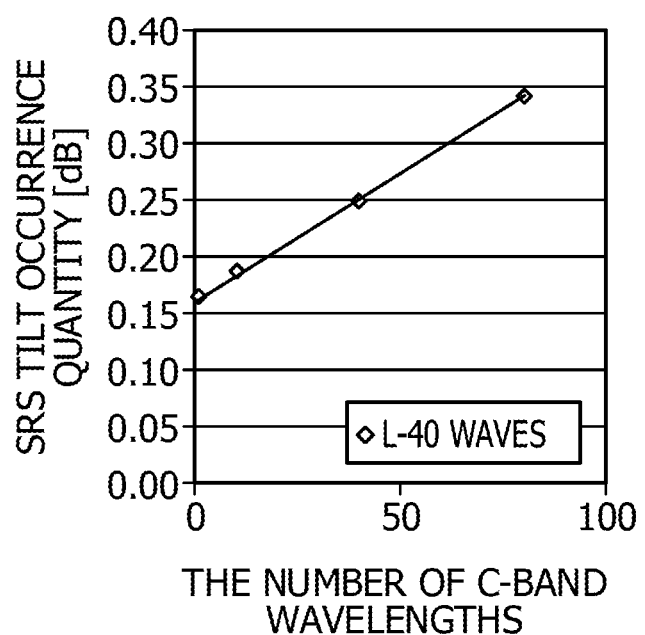
FIG. 6 is an explanatory diagram illustrating the relationship between the SRS tilt occurrence quantity and the number of C-band wavelengths when attention is focused on the L-band 40 waves.

FIG. 5 is an explanatory diagram illustrating the relationship between the L-band SRS tilt occurrence quantity and the number of L-band wavelengths. As illustrated in FIG. 5, the L-band SRS tilt occurrence quantity increases in proportion to the number of L-band wavelengths. However, its slope does not depend on an increase in the number of C-band wavelengths as illustrated in FIG. 5, and the SRS tilt occurrence quantity increases at a fixed amount. FIG. 6 is an explanatory diagram illustrating the relationship between the SRS tilt occurrence quantity and the number of C-band wavelengths when attention is focused on the L-band 40 waves. As illustrated in FIG. 6, the L-band SRS tilt occurrence quantity increases at a fixed amount in accordance with an increase in the number of C-band wavelengths, but its slope does not depend on the number of C-band wavelengths. That is to say, although the SRS tilt occurrence quantity in the second WDM signal increases in accordance with an increase in the number of wavelengths in the first WDM signal, its slope does not depend on the number of wavelengths in the first WDM signal. Accordingly, in consideration of the relationships illustrated in FIG. 5 and FIG. 6, it is possible to calculate a second tilt compensation quantity in the second WDM signal using (second power value×factor c)+(first power value×factor d).

Figure 7:
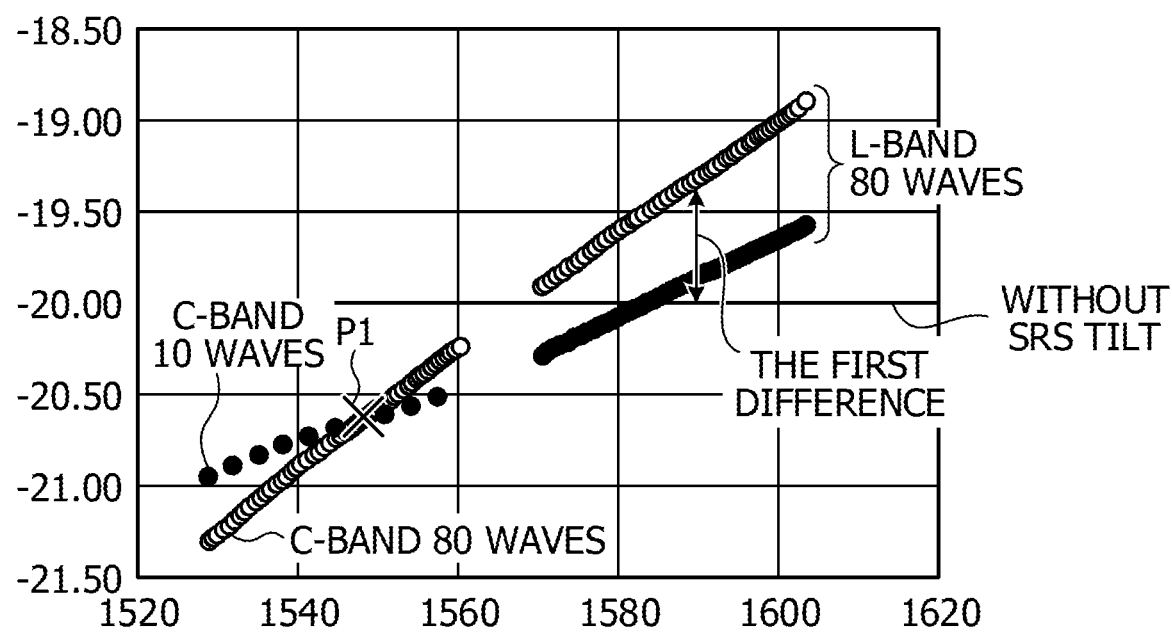
FIG. 7 is an explanatory diagram illustrating an example of changes in the L-band SRS tilt occurrence quantities when the number of C-band wavelengths is changed.
Figure 8:
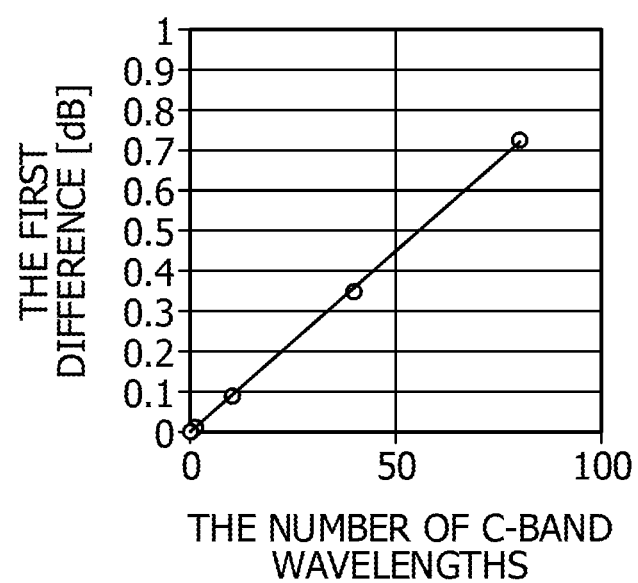
FIG. 8 is an explanatory diagram illustrating an example of the relationship between the number of C-band wavelengths and a first difference.

Next, a description will be given of the numerical expressions for calculating the first power compensation quantity and the second power compensation quantity. FIG. 7 is an explanatory diagram illustrating an example of changes in the L-band SRS tilt occurrence quantities when the number of C-band wavelengths is changed. In the explanatory diagram illustrated in FIG. 7, a change in the SRS tilt quantities of L-band 80 waves is illustrated when the number of C-band wavelengths is assumed to be 10 waves, and a change in the SRS tilt quantities of L-band 80 waves is illustrated when the number of C-band wavelengths is assumed to be 80 waves. As illustrated in FIG. 7, although the tilt in the C-band increases as the number of C-band wavelengths increases, the power difference between optical wavelength bands inclines symmetrically at its center P1 of the C-band, and thus the power quantity of the entire C-band does not change. That is to say, for the power difference between the first WDM signal and the second WDM signal, although the tilt in the first WDM signal increases as the number of wavelengths in the first WDM signal increases, the power quantity of the entire first WDM signal does not change. In contrast, the SRS tilt occurrence quantity of L-band 80 waves changes in accordance with a change of the number of wavelengths of C-band 10 waves and C-band 80 waves. That is to say, the SRS tilt occurrence quantity in the second WDM signal changes in accordance with a change of the number of wavelengths in the first WDM signal. The first difference, which is the difference between the SRS tilt occurrence quantity in L-band 80 and the SRS tilt none, changes in accordance with a change of the number of C-band wavelengths. FIG. 8 is an explanatory diagram illustrating an example of the relationship between the number of C-band wavelengths and a first difference. As illustrated in FIG. 8, the first difference increases as the number of C-band wavelengths increases, and thus has a proportional relationship having a positive slope. As described above, it is possible to replace the number of wavelengths with power. Accordingly, in consideration of the relationships illustrated in FIG. 7 and FIG. 8, it is possible to calculate the second power compensation quantity in the second WDM signal using (first power value× factor f).

Figure 9:
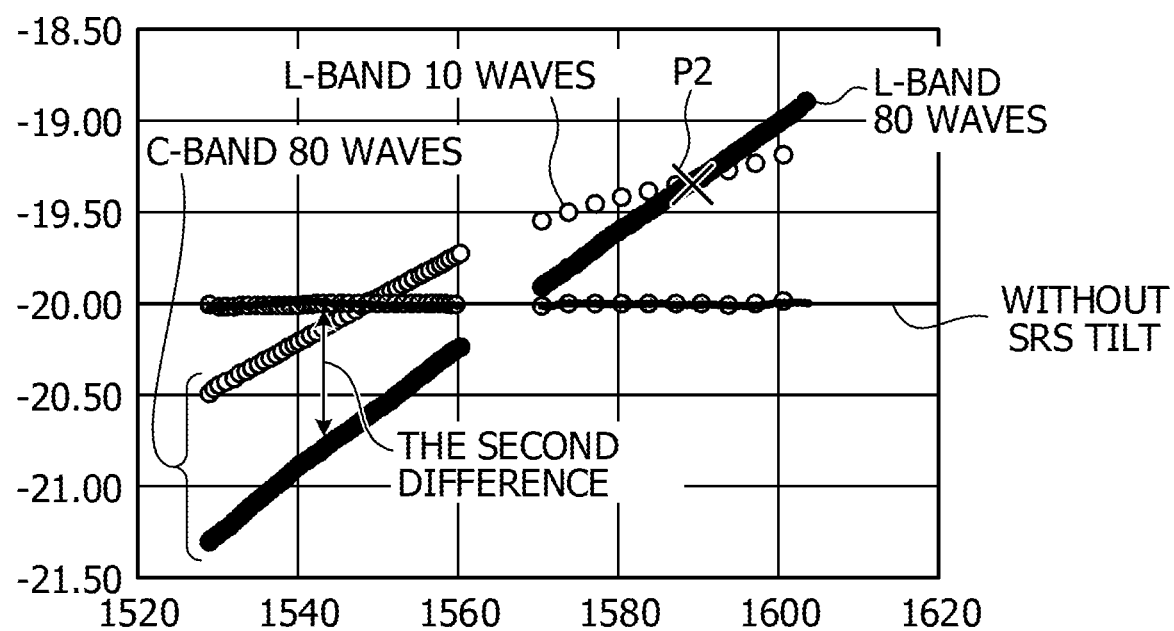
FIG. 9 is an explanatory diagram illustrating an example of changes in the C-band SRS tilt occurrence quantities when the number of L-band wavelengths is changed.
Figure 10:
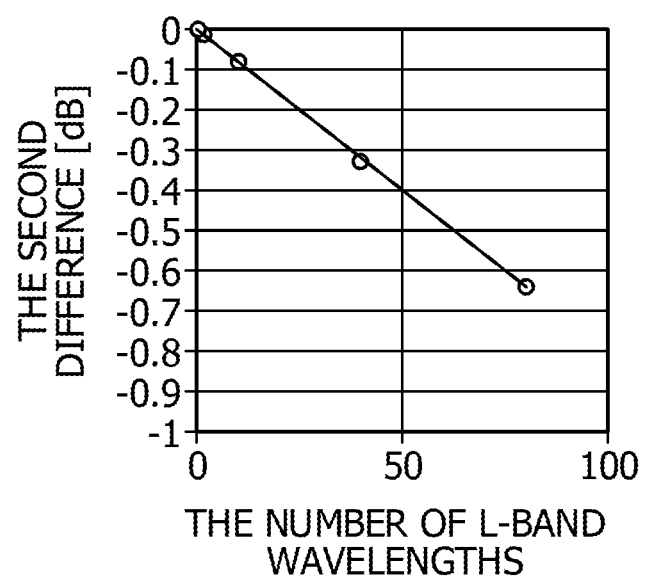
FIG. 10 is an explanatory diagram illustrating an example of the relationship between the number of L-band wavelengths and a second difference.

FIG. 9 is an explanatory diagram illustrating an example of changes in the C-band SRS tilt occurrence quantities when the number of L-band wavelengths is changed. In the explanatory diagram illustrated in FIG. 9, a change in the SRS tilt quantity of C-band 80 waves when the number of L-band wavelengths is assumed to be 10 is illustrated, and a change in the SRS tilt quantity of C-band 80 waves when the number of L-band wavelengths is assumed to be 80 is illustrated. As illustrated in FIG. 9, while the tilt in the C-band increases as the number of L-band wavelengths increases, the power difference between the optical wavelength bands symmetrically inclines at a P2 of the center L-band, and thus the power quantity of the entire L-band does not change. That is to say, for the power difference between the first WDM signal and the second WDM signal, although the tilt in the second WDM signal increases as the number of wavelengths of the second WDM signal increases, the power quantity of the entire second WDM signal does not change. In contrast, the SRS tilt occurrence quantity of C-band 80 waves changes in accordance with the changes of the number of wavelengths of the L-band 10 waves and the L-band 80 waves. That is to say, the SRS tilt occurrence quantity in the first WDM signal changes in accordance with a change of the number of wavelengths in the second WDM signal. The second difference, which is the difference between the SRS tilt occurrence quantity in C-band 80 and the SRS tilt none, changes in accordance with a change of the number of L-band wavelengths. FIG. 10 is an explanatory diagram illustrating an example of the relationship between the number of L-band wavelengths and a second difference. As illustrated in FIG. 10, the second difference decreases as the number of L-band wavelengths increases, and thus has a proportional relationship having a negative slope. Accordingly, in consideration of the relationships illustrated in FIG. 9 and FIG. 10, it is possible to calculate the first power compensation quantity in the first WDM signal using (second power value×factor e).

Figure 11:
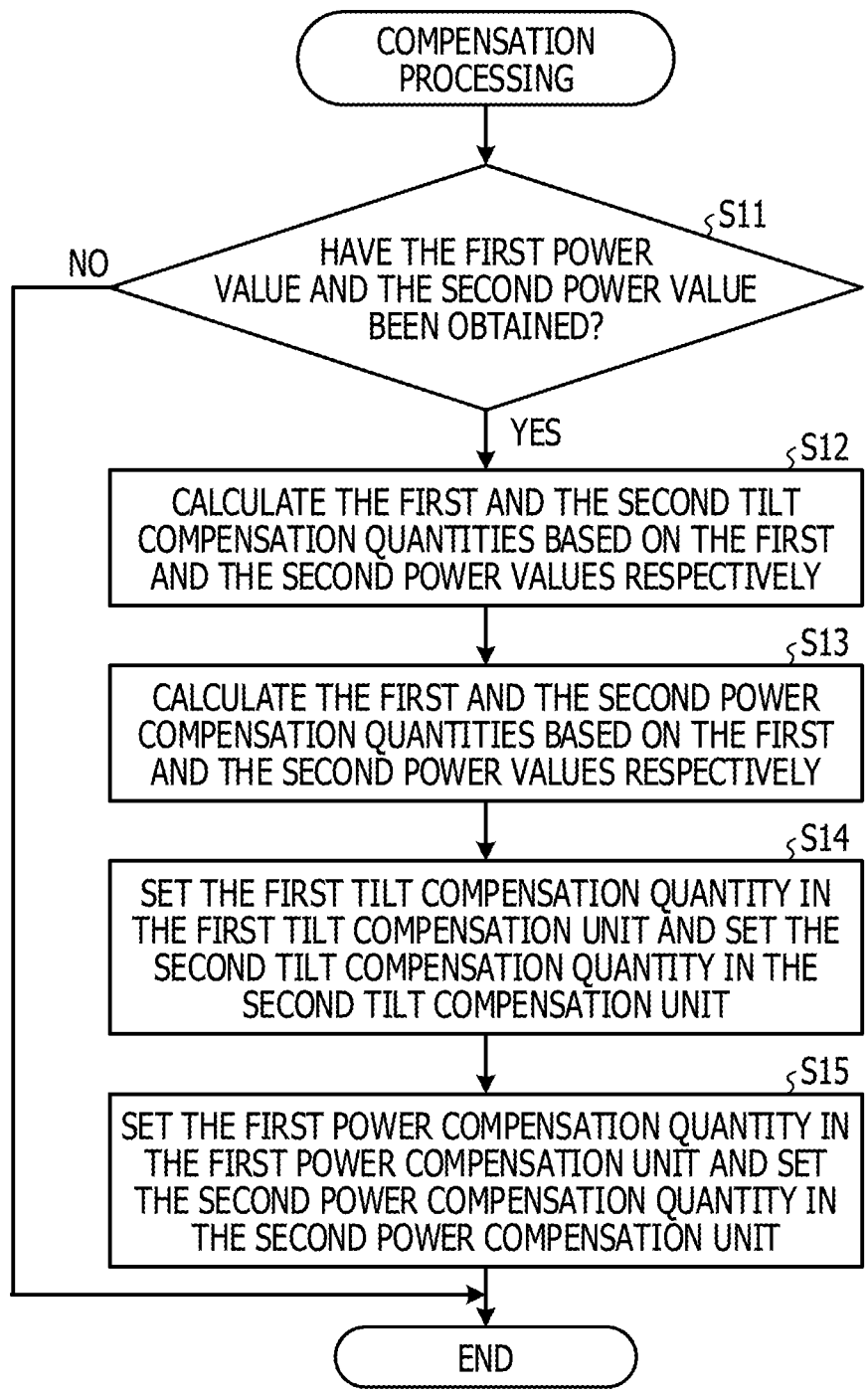
FIG. 11 is a flowchart illustrating an example of the processing operation of a control unit in a WDM apparatus related to compensation processing.

Next, a description will be given of the operation of the WDM system 1 according to the first embodiment. FIG. 11 is a flowchart illustrating an example of the processing operation of the control unit 18 in the WDM apparatus 2 related to compensation processing. The control unit 18 determines whether or not a first power value and a second power value have been obtained from the first detection unit 17A and the second detection unit 17B respectively (step S11). When the first power value and the second power value have been obtained (affirmation in step S11), the first calculation unit 42 in the control unit 18 calculates a first tilt compensation quantity and a second tilt compensation quantity based on the first and the second power values and the loss factor (step S12). The second calculation unit 43 in the control unit 18 calculates a first power compensation quantity and a second power compensation quantity based on the first and the second power values and the loss factor (step S13).

The tilt control unit 44 in the control unit 18 sets the first tilt compensation quantity in the first tilt compensation unit 22A in the first transmission amplifier 15A and sets the second tilt compensation quantity in the second tilt compensation unit 22B in the second transmission amplifier 15B (step S14). As a result, the first tilt compensation unit 22A performs tilt compensation on the first WDM signal so as to reduce the tilt quantity in the first WDM signal. The second tilt compensation unit 22B performs tilt compensation on the second WDM signal so as to reduce the tilt quantity in the second WDM signal. The power control unit 45 in the control unit 18 sets the first power compensation quantity in the first power compensation unit 24A in the first transmission amplifier 15A and sets the second power compensation quantity in the second power compensation unit 24B in the second transmission amplifier 15B (step S15). The control unit 18 terminates the processing operation illustrated in FIG. 11. As a result, the first power compensation unit 24A compensates for the output power of the first WDM signal after the tilt compensation so as to reduce the power difference between the first WDM signal after the tilt compensation and the second WDM signal. The second power compensation unit 24B compensates for the output power of the second WDM signal after the tilt compensation so as to reduce the power difference between the first WDM signal after the tilt compensation and the second WDM signal.

The WDM apparatus 2 according to the first embodiment calculates the first and the second tilt compensation quantities using the first and the second power values of the first WDM signal and the second WDM signal in the WDM signal, which have been detected in the output stage of the multiplexing unit 16 and the loss factor of the optical fiber 3. The WDM apparatus 2 calculates the first and the second power compensation quantities using the first and the second power values that have been detected in the output stage, and the loss factor of the optical fiber 3. The WDM apparatus 2 compensates for the tilt in the first WDM signal based on the first tilt compensation quantity so as to reduce the tilt in the first WDM signal and compensates for the tilt in the second WDM signal so as to reduce the tilt in the second WDM signal based on the second tilt compensation quantity. The WDM apparatus 2 compensates for the power of the entire first WDM signal based on the first power compensation quantity so as to reduce the power difference between the first WDM signal and the second WDM signal. The WDM apparatus 2 compensates for the power of the entire second WDM signal so as to reduce the power difference between the first WDM signal and the second WDM signal based on the second power compensation quantity. As a result, in a multiband system, when the number of wavelengths is changed during operation, it is possible to realize the SRS tilt compensation for each of the optical wavelength bands at high speed and with high precision.

The first calculation unit 42 in the WDM apparatus 2 calculates the tilt quantities in the first WDM signal and the second WDM signal based on the factor in accordance with the first power value, the second power value, and the fiber type of the optical fiber 3. As a result, it is possible to realize the tilt compensation with high precision in accordance with the type of the optical fiber 3.

The second calculation unit 43 in the WDM apparatus 2 calculates the power difference between the first WDM signal and the second WDM signal based on the factor in accordance with the first power value, the second power value, and the fiber type of the optical fiber 3. As a result, it is possible to realize the tilt compensation with high precision in accordance with the type of the optical fiber 3.

The first WSS 13A controls power for each wavelength in the first WDM signal such that the power deviation among the wavelengths in the first WDM signal input to the first tilt compensation unit 22A falls within a predetermined range using the power monitoring result for each wavelength in the first WDM signal output from the first OCM 14A. As a result, the first WDM signal having little power deviation is provided to the first tilt compensation unit 22A, and thus it is possible to realize the tilt compensation with high precision.

The second WSS 13B controls power for each wavelength in the second WDM signal such that the power deviation among the wavelengths in the second WDM signal input to the second tilt compensation unit 22B falls within a predetermined range using the power monitoring result for each wavelength in the second WDM signal output from the second OCM 14B. As a result, the second WDM signal having little power deviation is provided to the second tilt compensation unit 22B, and thus it is possible to realize the tilt compensation with high precision.

The first detection unit 17A and the second detection unit 17B are disposed in the output stage of the multiplexing unit 16 and detect the first power value of the first WDM signal and the second power value of the second WDM signal from the WDM signal output from the multiplexing unit 16. As a result, it is possible to realize the tilt compensation with high precision using the power value on which the WDM signal, which is an output of the multiplexing unit 16, is reflected.

The first WDM signal and the second WDM signal after having been subjected to the tilt compensation according to the first embodiment have a power difference that occurs among the bands by the power deviation compensation, it is possible to assume that an error occurs when the tilt compensation quantity and the power compensation quantity are calculated using the first and the second power values. Thus, the first and the second power values may be compensated using a reference value stored in advance, and the first and the second power values after the compensation may be notified to the first calculation unit 42 and the second calculation unit 43. Thus, it is possible to suitably change the first and the second power values.

In the WDM apparatus 2 according to the first embodiment, the first detection unit 17A and the second detection unit 17B are disposed in the output stage of the multiplexing unit 16. However, instead of the first detection unit 17A and the second detection unit 17B, the detection units may be disposed in the input stage of the multiplexing unit 16. A description will be given of such an embodiment as a second embodiment.

Second Embodiment

Figure 12:
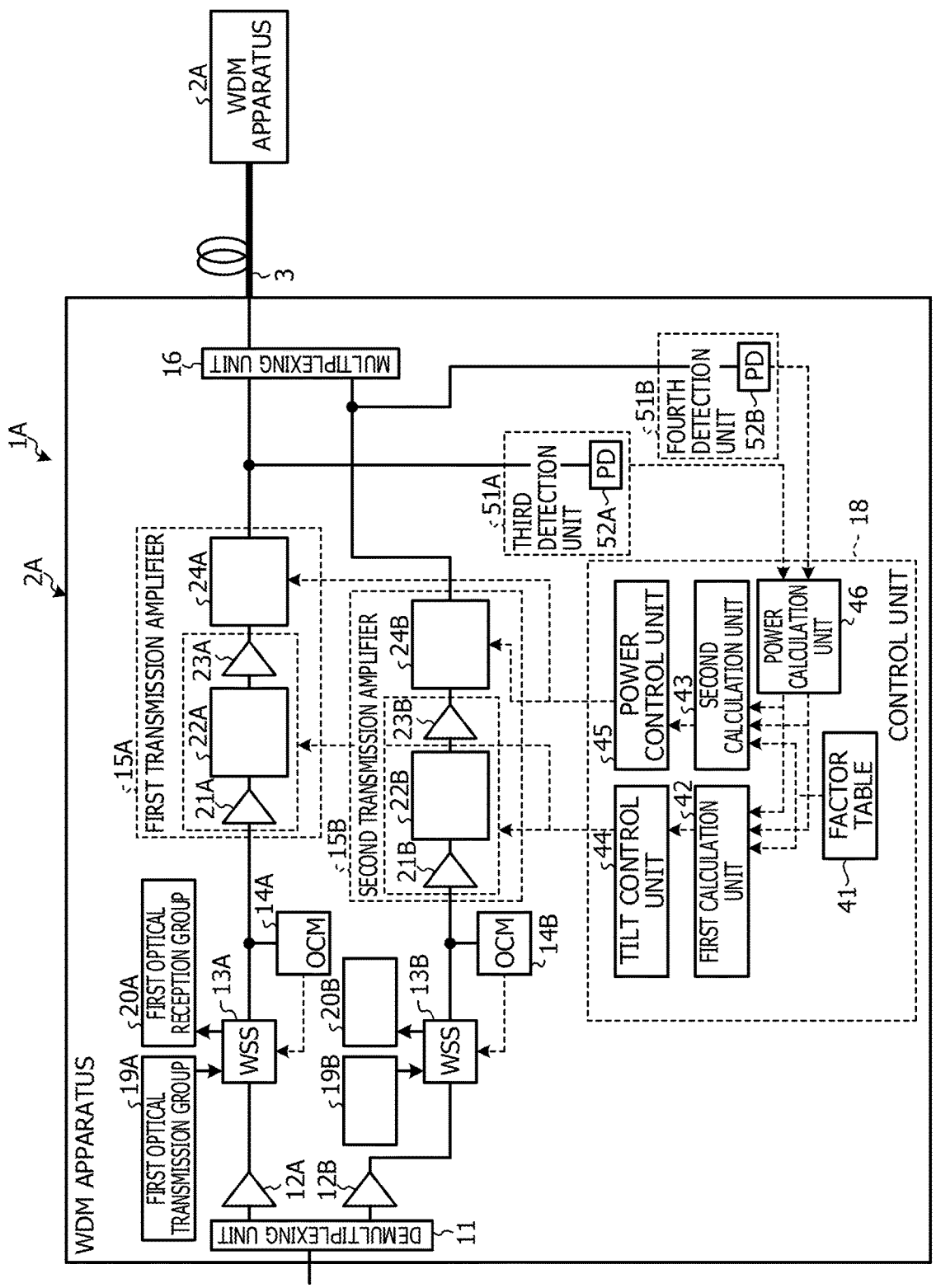
FIG. 12 is an explanatory diagram illustrating an example of a WDM system according to a second embodiment.

FIG. 12 is an explanatory diagram illustrating an example of a WDM system 1A according to a second embodiment. The same reference sign is given to the same component as that in the WDM system 1 illustrated in FIG. 1, and thus a description will be omitted of the duplicated components and operation. The different point between the WDM apparatus 2 illustrated in FIG. 1 and the WDM apparatus 2A illustrated in FIG. 12 is that a third detection unit 51A and a fourth detection unit 51B are disposed instead of the first detection unit 17A and the second detection unit 17B, respectively.

The third detection unit 51A includes a PD 52A that photoelectrically converts the optical power of the first WDM signal after the power compensation performed by the first power compensation unit 24A between the first transmission amplifier 15A and the multiplexing unit 16 to detect a third power value. The fourth detection unit 51B includes a PD 52B that photoelectrically converts the optical power of the second WDM signal after the power compensation performed by the second power compensation unit 24B between the second transmission amplifier 15B and the multiplexing unit 16 to detect a fourth power value.

The third detection unit 51A outputs the detected third power value to a power calculation unit 46. The fourth detection unit 51B outputs the detected fourth power value to the power calculation unit 46. The power calculation unit 46 subtracts the loss power value of the multiplexing unit 16 from the third power value to calculate the first power value and notifies the first calculation unit 42 and the second calculation unit 43 of the first power value. The power calculation unit 46 calculates the loss power value of the multiplexing unit 16 from the fourth power value to calculate the second power value and notifies the first calculation unit 42 and the second calculation unit 43 of the second power value.

The third detection unit 51A detects the third power value that becomes a base of the first power value from the first WDM signal after the power compensation, and thus does not have to include the BPF compared with the first embodiment. The fourth detection unit 51B detects the fourth power value that becomes a base of the second power value from the second WDM signal after the power compensation, and thus does not have to include the BPF compared with the first embodiment.

The WDM apparatus 2A according to the second embodiment calculates a first power value by subtracting the loss power value of the multiplexing unit 16 from the power value of the first WDM signal, which is detected between the first transmission amplifier 15A and the multiplexing unit 16. The WDM apparatus 2A calculates a second power value by subtracting the loss power value of the multiplexing unit 16 from the power value of the second WDM signal, which is detected between the second transmission amplifier 15B and the multiplexing unit 16. As a result, it is possible to realize the tilt compensation on which the first WDM signal and the second WDM signal after the power compensation that are input to the multiplexing unit 16 are reflected.

In the first embodiment, the first detection unit 17A and the second detection unit 17B are disposed in the output stage of the multiplexing unit 16. However, instead of the first detection unit 17A and the second detection unit 17B, a detection unit may be disposed in the input stage of the first transmission amplifier 15A and the second transmission amplifier 15B. A description will be given of such an embodiment as a third embodiment in the following.

Third Embodiment

Figure 13:
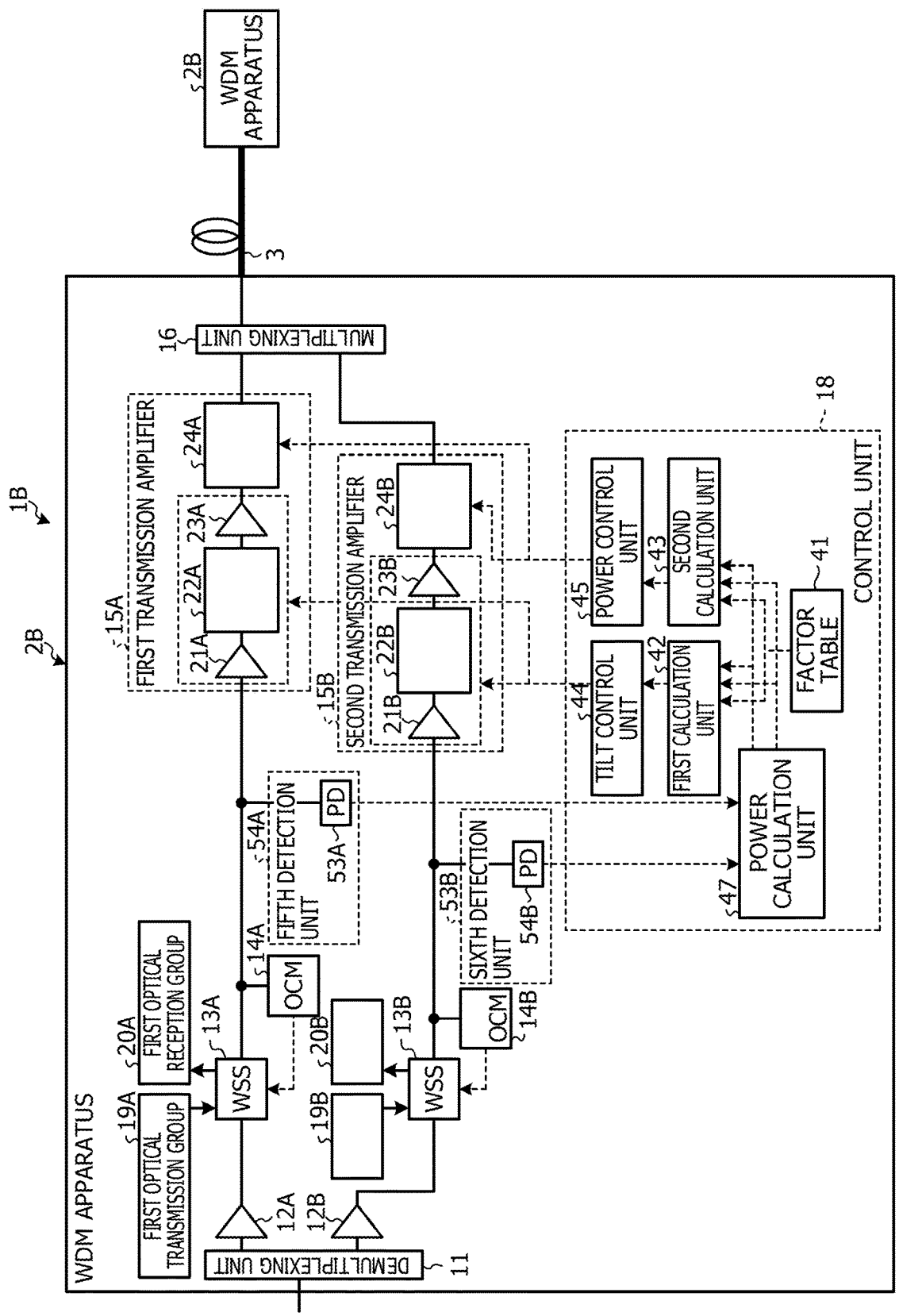
FIG. 13 is an explanatory diagram illustrating an example of a WDM system according to a third embodiment.

FIG. 13 is an explanatory diagram illustrating an example of a WDM system 1B according to a third embodiment. The same reference sign is given to the same component as that in the WDM system 1 illustrated in FIG. 1, and thus a description will be omitted of the duplicated components and operation.

The different point between the WDM apparatus 2 illustrated in FIG. 1 and the WDM apparatus 2B illustrated in FIG. 13 is that a fifth detection unit 53A and a sixth detection unit 53B are disposed instead of the first detection unit 17A and the second detection unit 17B, respectively.

The fifth detection unit 53A includes a PD 54A that photoelectrically converts the optical power of the first WDM signal of the first WSS 13A between the first WSS 13A and the first transmission amplifier 15A to detect a fifth power value. The sixth detection unit 53B includes a PD 54B that photoelectrically converts the optical power of the second WDM signal of the second WSS 13B between the second WSS 13B and the second transmission amplifier 15B to detect a sixth power value.

The fifth detection unit 53A outputs the detected fifth power value to the power calculation unit 47. The sixth detection unit 53B outputs the detected sixth power value to the power calculation unit 47. The power calculation unit 47 calculates a first power value by subtracting the loss power value of the multiplexing unit 16 from the fifth power value and notifies the first calculation unit 42 and the second calculation unit 43 of the first power value. The power calculation unit 47 calculates a second power value by subtracting the loss power value of the multiplexing unit 16 from the sixth power value and notifies the first calculation unit 42 and the second calculation unit 43 of the second power value.

In the WDM apparatus 2 according to the first embodiment, when an optical power of the WDM signal in the output stage of the multiplexing unit 16 is detected, it is assumed that a first power value and a second power value are detected in a state in which there is a power difference among the optical wavelength bands due to the power compensation after the tilt compensation. Accordingly, when a compensation quantity is calculated using the first and the second power values, it is thought that an error might occur.

On the other hand, in the WDM apparatus 2B according to the third embodiment, the first and the second power values are calculated based on the fifth and the sixth power values of the first and the second WDM signals before the tilt compensation in the input stages of the first and second transmission amplifiers 15A and 15B. Accordingly, a compensation quantity is calculated by using the first and the second power values so that it is possible to avoid an error.

In the WDM system 1A according to the second embodiment, ripples occur in the WDM signal that is output from the upstream side WDM apparatus 2A to the downstream side WDM apparatus 2A. Thus, a description will be given of a WDM system 1C that reduces ripples according to an embodiment as a fourth embodiment in the following.

Fourth Embodiment

Figure 14:
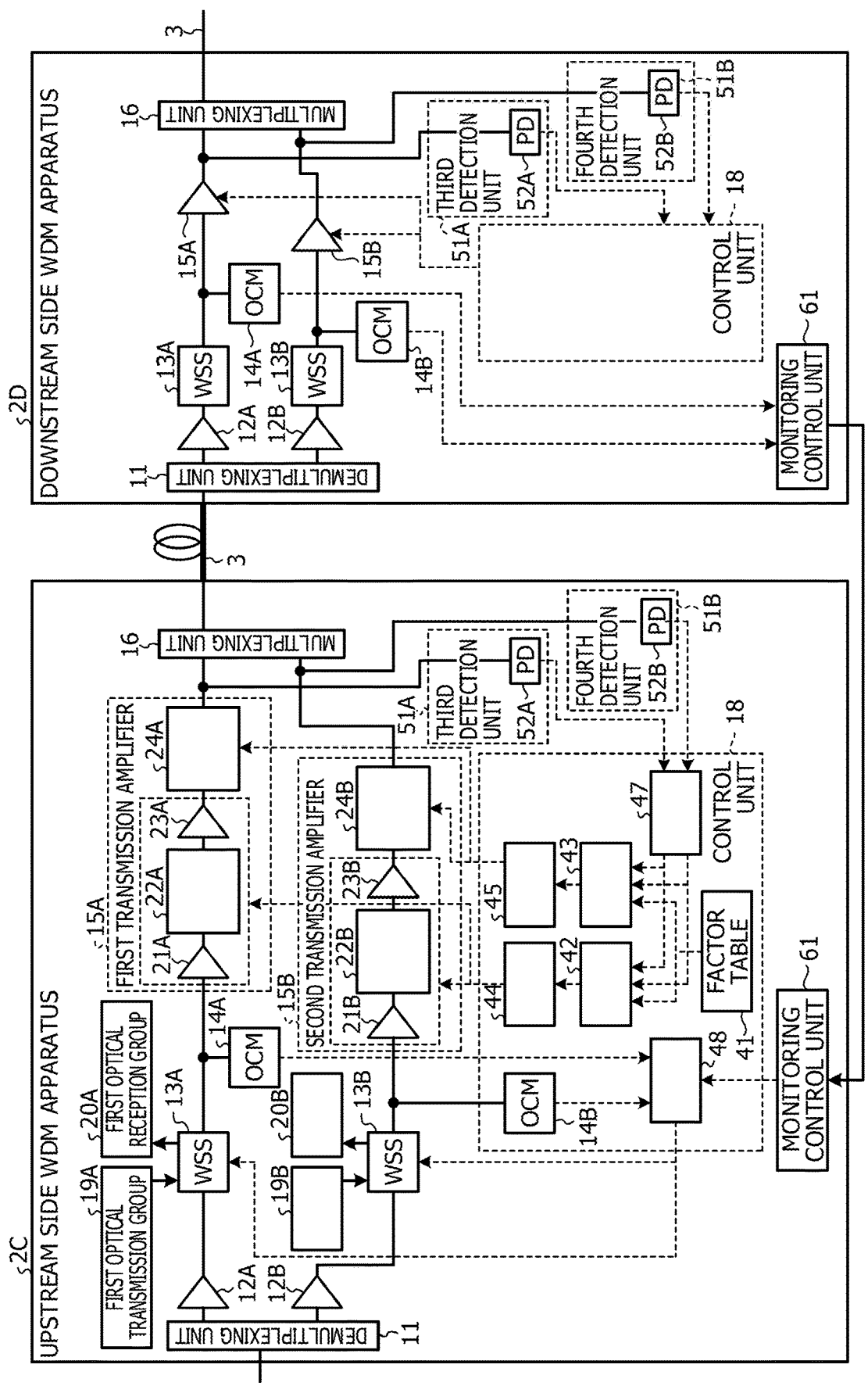
FIG. 14 is an explanatory diagram illustrating an example of a WDM system according to a fourth embodiment.

FIG. 14 is an explanatory diagram illustrating an example of a WDM system 1C according to a fourth embodiment. The same reference sign is given to the same component as that in the WDM system 1A illustrated in FIG. 12, and thus a description will be omitted of the duplicated components and operation. The WDM system 1C illustrated in FIG. 14 includes an upstream side WDM apparatus 2C, a downstream side (the opposite side) WDM apparatus 2D, and an optical fiber 3 that optically connects the upstream side WDM apparatus 2C and the downstream side WDM apparatus 2D. The upstream side WDM apparatus 2C and the downstream side WDM apparatus 2D have the same configuration.

The upstream side WDM apparatus 2C and the downstream side WDM apparatus 2D include a monitoring control unit 61, and a deviation calculation unit 48 in the control unit. The monitoring control unit 61 communicates with another WDM apparatus 2 using an optical supervisory channel (OSC).

The first OCM 14A in the upstream side WDM apparatus 2C monitors the optical power for each wavelength in the first WDM signal output from the upstream side first WSS 13A and notifies the monitoring control unit 61 of the monitor result. The second OCM 14B in the upstream side WDM apparatus 2C monitors the optical power for each wavelength in the second WDM signal output from the upstream side second WSS 13B and notifies the deviation calculation unit 48 in the upstream side control unit 18 of the monitor result.

The first OCM 14A in the downstream side WDM apparatus 2D monitors the optical power for each wavelength in the first WDM signal output from the downstream side first WSS 13A and notifies the monitoring control unit 61 of the monitor result. The second OCM 14B in the downstream side WDM apparatus 2D monitors the optical power for each wavelength in the second WDM signal output from the downstream side second WSS 13B and notifies the downstream side monitoring control unit 61 of the monitor result. The monitoring control unit 61 in the downstream side WDM apparatus 2D notifies the monitoring control unit 61 in the upstream side WDM apparatus 2C of the optical power for each wavelength of the downstream side first WDM signal and the optical power for each wavelength of the downstream side second WDM signal. The monitoring control unit 61 in the upstream side WDM apparatus 2C inputs the optical power for each wavelength of the downstream side first WDM signal and the optical power for each wavelength of the downstream side second WDM signal into the deviation calculation unit 48.

The deviation calculation unit 48 calculates a first ripple quantity of the first WDM signal by the deviation between the optical power for each wavelength in the downstream side first WDM signal and the optical power for each wavelength in the upstream side first WDM signal. The deviation calculation unit 48 calculates a second ripple quantity of the second WDM signal by the deviation between the optical power for each wavelength in the downstream side second WDM signal and the optical power for each wavelength in the upstream side second WDM signal. The deviation calculation unit 48 sets the first ripple quantity in the first WSS 13A and sets the second WSS 13B in the second ripple quantity.

The first WSS 13A in the upstream side WDM apparatus 2C controls the optical power for each wavelength in the first WDM signal so as to cancel the first ripple quantity. The second WSS 13B in the upstream side WDM apparatus 2C controls the optical power for each wavelength in the second WDM signal so as to cancel the second ripple quantity. For convenience of explanation, an example of canceling 100% of the ripple is illustrated. However, the rate of cancellation is not limited to 100%, and it is possible to suitably change the rate.

The WDM apparatuses 2C and 2D according to the fourth embodiment suppress the ripples of the gain for each wavelength in addition to controlling the tilt compensation so as to uniformize the tilt deviation among the wavelengths in the first WDM signal and the second WDM signal. Accordingly, it is possible to realize the tilt compensation in the first WDM signal and the second WDM signal with high precision.

The WDM apparatus 2 includes the demultiplexing unit 11, the first and the second reception amplifiers 12A and 12B, the first and the second WSSs 13A and 13B, the first and second transmission amplifiers 15A and 15B, the multiplexing unit 16, the first and the second detection units 17A and 17B, and the control unit 18 as one package. The input stage of the demultiplexing unit 11 is coupled by an optical connector, and the output stage of the multiplexing unit 16 is coupled by an optical connector. The description has been given of the WDM apparatuses 2A to 2D in the form of one package in the same manner.

However, the WDM apparatus 2 may be configured not by a single package, but may be configured by, for example, three packages. A first package includes, for example, the first reception amplifier 12A, the first WSS 13A, and the first amplifier 15A. A second package includes, for example, the second reception amplifier 12B, the second WSS 13B, and the second transmission amplifier 15A. A third package includes the demultiplexing unit 11, the multiplexing unit 16, the first and the second detection units 17A and 17B, and the control unit 18.

The first reception amplifier 12A in the first package and the demultiplexing unit 11 in the third package are coupled by an optical connector, and the second reception amplifier 12B in the second package and the demultiplexing unit 11 in the third package are coupled by an optical connector. The first transmission amplifier 15A in the first package and the multiplexing unit 16 in the third package are coupled by an optical connector, and the second transmission amplifier 15B in the second package and the multiplexing unit 16 in the third package are coupled by an optical connector. The input stage of the demultiplexing unit 11 in the third optical package is coupled by an optical connector, and the output stage of the multiplexing unit 16 is coupled by an optical connector. The control unit 18 in the third package and the first transmission amplifier 15A in the first package are coupled by an electrical connector, and the control unit 18 in the third package and the second transmission amplifier 15B in the second package are coupled by an electrical connector.

For convenience of explanation, the WDM apparatus 2 has been illustrated as an example of the case where a WDM signal produced by multiplexing the C-band first WDM signal and the L-band second WDM signal is output. However, it is possible to apply the present disclosure to the case of outputting a WDM signal produced by multiplexing, for example, an S-band second WDM signal having a short wavelength of 1460 nm to 1530 nm and a C-band first WDM signal. The first WDM signal is not limited to the C-band and may be an L-band or an S-band or the like. The second WDM signal is not limited to the L-band, may be a C-band, an S-band, or the like, and it is possible to suitably change the band. For the WDM apparatus 2, an example of the WDM signal including two optical wavelength bands has been illustrated. However, for example, it is possible to apply the present disclosure to the case of a WDM signal including three or more optical wavelength bands.

In the present embodiment, an example has been described in the case of including a factor table 41 that manages the factor 41B and the loss factor 41C for each fiber type 41A. However, the factor 41B and the loss factor 41C may be input to the control unit 18 for each fiber type 41A, or the control unit 18 may identify the fiber type of the optical fiber 3 and may set the factor and the loss factor in accordance with the identified result. Thus, it is possible to suitably change the way of setting the factor 41B and the loss factor 41C.

In the above embodiments, the wavelength ranges of C-band, S-band, and L-band are defined. However, the wavelength ranges are not limited to these ranges, and it is possible to suitably change the settings of the ranges.

In the above embodiments, an example of the case of using C-band and L-band has been described. However, the present disclosure is not limited to C-band, S-band, and L-band. For example, the present disclosure may be applied to Original (O)-band (1260 nm to 1360 nm), Extended (E)-band (1360 nm to 1460 nm), and Ultralong wavelength (U)-band (1625 nm to 1675 nm), and it is possible to suitably change the wavelength.

For example, the case has been illustrated in which the WDM apparatus 2 includes the optical transmission groups 19A and 19B or the optical reception groups 20A and 20B. However, it is possible to apply the present disclosure to the case of externally coupling the optical transmission groups or the optical reception groups.

Each component in each unit illustrated in the diagrams does not have to be physically configured as illustrated in the diagrams. That is to say, the specific form of distribution or integration of each unit is not limited to the configuration illustrated in the diagrams. It is possible to configure all of or a part of the components in a functionally or a physically distributed or integrated manner in any units in accordance with the various loads, the use state, and the like.

All of or any part of the various processing functions that are performed by each apparatus may be executed on a central processing unit (CPU) (or a microcomputer, such as a micro processing unit (MPU), a micro controller unit (MCU), or the like). It goes without saying that all of or any part of the various processing functions may be performed by programs that are analyzed and executed by a CPU (or a microcomputer, such as an MPU, an MCU, or the like) or by hardware of wired logic.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An optical wavelength multiplexing transmission apparatus comprising:
    a demultiplexer configured to demultiplex a multiplexed signal including a plurality of optical wavelength multiplexed signals having individual optical wavelength bands into an optical wavelength multiplexed signal for each of the optical wavelength bands;
    a detector configured to detect a power value of each of the optical wavelength multiplexed signals for each of the optical wavelength bands;
    a plurality of first compensators configured to compensate for a tilt in the optical wavelength multiplexed signal based on the power value for each of the optical wavelength bands;
    a plurality of second compensators configured to compensate for a power of the optical wavelength multiplexed signal for each of the optical wavelength bands so as to reduce a power difference among optical wavelength multiplexed signals after the tilt compensation based on the power value for each of the optical wavelength bands; and a multiplexer configured to multiplex each of the optical wavelength multiplexed signals after the power compensation and output a multiplexed signal.

2. The optical wavelength multiplexing transmission apparatus according to claim 1,
wherein the plurality of first compensators compensate for the tilt in the optical wavelength multiplexed signal for each of the optical wavelength bands based on the power value for each of the optical wavelength bands and a factor in accordance with a fiber type of an optical fiber for transmitting the optical wavelength multiplexed signals.

3. The optical wavelength multiplexing transmission apparatus according to claim 1,
wherein the plurality of second compensators compensate for the power of the optical wavelength multiplexed signal for each of the optical wavelength bands based on the power value for each of the optical wavelength bands and a factor in accordance with a fiber type of an optical fiber for transmitting the optical wavelength multiplexed signals.

4. The optical wavelength multiplexing transmission apparatus according to claim 1, further comprising:
a wavelength selective switch configured to control the power for each wavelength in the optical wavelength multiplexed signal output from the demultiplexer and output an optical wavelength multiplexed signal after the power control to the first compensator; and
a monitor configured to monitor the power for each wavelength in the optical wavelength multiplexed signal in an output stage of the wavelength selective switch,
wherein the wavelength selective switch controls the power for each wavelength in the optical wavelength multiplexed signal so as to keep a power deviation among wavelengths in the optical wavelength multiplexed signal input into the first compensator within a predetermined range based on a monitoring result of the power for each wavelength in the optical wavelength multiplexed signal output from the monitor.

5. The optical wavelength multiplexing transmission apparatus according to claim 1, further comprising:
a wavelength selective switch configured to control the power for each wavelength in the optical wavelength multiplexed signal output from the demultiplexer and output an optical wavelength multiplexed signal after the power control to the first compensator; and
a monitor configured to monitor the power for each wavelength in the wavelength selective switch in an output stage of the optical wavelength multiplexed signal,
wherein the wavelength selective switch controls the power for each wavelength in the optical wavelength multiplexed signal input into the first compensator based on a power monitoring result for each wavelength in the optical wavelength multiplexed signal for each of the optical wavelength bands in another optical wavelength multiplexing transmission apparatus that receives the optical wavelength multiplexed signal output from the multiplexer and a power monitoring result for each wavelength in the optical wavelength multiplexed signal for each of the optical wavelength bands in the monitor.

6. The optical wavelength multiplexing transmission apparatus according to claim 1,
wherein the detector detects the power value of the optical wavelength multiplexed signal for each of the optical wavelength bands from the multiplexed signal output from the multiplexer.

7. The optical wavelength multiplexing transmission apparatus according to claim 1,
wherein the detector detects the power value by subtracting a power loss value of the multiplexer from the power value of the optical wavelength multiplexed signal for each of the optical wavelength bands after the power compensation output from the second compensator between the second compensator and the multiplexer.

8. The optical wavelength multiplexing transmission apparatus according to claim 1,
wherein the detector detects the power value by subtracting a power loss value of the multiplexer from the power value of the optical wavelength multiplexed signal for each of the optical wavelength bands before the tilt compensation performed by the first compensator between the demultiplexer and the first compensator.

9. An optical wavelength multiplexing transmission method comprising:
demultiplexing a multiplexed signal including a plurality of optical wavelength multiplexed signals having individual optical wavelength bands into an optical wavelength multiplexed signal for each of the optical wavelength bands;
detecting a power value of each of the optical wavelength multiplexed signals for each of the optical wavelength bands;
compensating for a tilt in the optical wavelength multiplexed signal based on the power value for each of the optical wavelength bands;
compensating for a power of the optical wavelength multiplexed signal for each of the optical wavelength bands so as to reduce a power difference among optical wavelength multiplexed signals after the tilt compensation based on the power value for each of the optical wavelength bands; and
multiplexing each of the optical wavelength multiplexed signals after the power compensation and outputting a multiplexed signal.

10. An optical wavelength multiplexing transmission apparatus comprising:
a demultiplexer configured to demultiplex a multiplexed signal including a first optical wavelength multiplexed signal having a first optical wavelength band and a second optical wavelength multiplexed signal having a second optical wavelength band into the first optical wavelength multiplexed signal and the second optical wavelength multiplexed signal;
a first detector configured to detect a first power value of the first optical wavelength multiplexed signal;
a second detector configured to detect a second power value of the second optical wavelength multiplexed signal;
a first tilt compensator configured to compensate for a tilt in the first optical wavelength multiplexed signal based on the first power value and the second power value;
a second tilt compensator configured to compensate for a tilt in the second optical wavelength multiplexed signal based on the first power value and the second power value;
a first power compensator configured to compensate for a power of the first optical wavelength multiplexed signal so as to reduce a power difference between the first optical wavelength multiplexed signal after the tilt compensation and the second optical wavelength multiplexed signal after the tilt compensation based on the second power value;

a second power compensator configured to compensate for a power of the second optical wavelength multiplexed signal so as to reduce a power difference between the first optical wavelength multiplexed signal after the tilt compensation and the second optical wavelength multiplexed signal after the tilt compensation based on the first power value; and a multiplexer configured to multiplex the first optical wavelength multiplexed signal after the power compensation and the second optical wavelength multiplexed signal after the power compensation and output a multiplexed signal.

* * * * *